(12) United States Patent
Kawamura et al.

(10) Patent No.: US 7,883,443 B2
(45) Date of Patent: Feb. 8, 2011

(54) METHOD AND SYSTEM FOR CONTROLLING AN ENGINE FOR A VEHICLE, AND A MOTORCYCLE

(75) Inventors: Naoki Kawamura, Takasago (JP); Satoru Watabe, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 635 days.

(21) Appl. No.: 11/522,111

(22) Filed: Sep. 15, 2006

(65) Prior Publication Data

US 2007/0060444 A1 Mar. 15, 2007

(30) Foreign Application Priority Data

Sep. 15, 2005 (JP) .............................. 2005-268738

(51) Int. Cl.
*B60W 10/04* (2006.01)
*B60W 10/10* (2006.01)
(52) U.S. Cl. ..................................................... 477/110
(58) Field of Classification Search ................... 477/98, 477/110, 181
See application file for complete search history.

(56) References Cited

U.S. PATENT DOCUMENTS

| | | | | |
|---|---|---|---|---|
| 3,918,257 A | * | 11/1975 | Hirose et al. ................... 60/284 |
| 4,123,904 A | * | 11/1978 | Nonoyama et al. ............. 60/290 |
| 4,300,501 A | * | 11/1981 | Suzuki ........................ 477/111 |
| 5,010,863 A | * | 4/1991 | Ishida et al. ............. 123/179.18 |
| 5,529,031 A | * | 6/1996 | Yoshioka .................. 123/90.15 |
| 6,227,180 B1 | * | 5/2001 | Hoffmann et al. ............ 123/564 |
| 6,513,489 B2 | * | 2/2003 | Osanai ................... 123/339.11 |
| 6,621,244 B1 | * | 9/2003 | Kiyomiya et al. ............ 318/611 |
| 7,101,311 B2 | * | 9/2006 | Deguchi ....................... 477/98 |
| 2002/0086593 A1 | * | 7/2002 | Shidara et al. .................. 440/1 |

FOREIGN PATENT DOCUMENTS

| | | |
|---|---|---|
| JP | 62-223430 | 10/1987 |
| JP | 06-010734 | 1/1994 |
| JP | 06-066187 | 3/1994 |
| JP | 2005-106048 | 4/2005 |

* cited by examiner

*Primary Examiner*—Tisha D Lewis
(74) *Attorney, Agent, or Firm*—Alleman Hall McCoy Russell & Tuttle LLP

(57) ABSTRACT

A method of controlling an engine for a vehicle including increasing an amount of air taken into the engine to an amount larger than an idling air amount corresponding an idling engine speed, when an engine speed of the engine is predetermined value or more, a throttle valve for controlling the amount of air taken into the engine has not been operated to be opened, and a clutch is in an off-state not to permit transmission of a drive force from the engine to a running drive element of the vehicle.

10 Claims, 8 Drawing Sheets

METHOD AND SYSTEM FOR CONTROLLING AN ENGINE FOR A VEHICLE, AND A MOTORCYCLE

TECHNICAL FIELD

The present invention relates to a method and system for controlling an engine equipped in a vehicle such as a motorcycle or a personal watercraft (PWC), and a motorcycle.

BACKGROUND ART

Some motorcycles are equipped with a throttle body constructed in such a manner that two valves, namely, a main throttle valve and a sub-throttle valve are provided in an air-intake device for controlling an amount of air taken into an engine from outside such that they are arranged in series in an air flow direction. The main throttle valve is opened and closed in association with a rider's throttle grip operation whereas the sub-throttle valve is driven by a motor and its opening degree is controlled by an ECU (electronic control unit). When the main throttle valve is abruptly opened or closed by the rider's abrupt throttle operation, the opening degree of the sub-throttle valve is controlled so as to reduce a rapid change in the amount of air taken into an engine to thereby change the engine speed smoothly. This provides the rider with a comfortable feeling ride.

In some throttle bodies, upon the sub-throttle valve being opened with the main throttle valve closed, rotation of the sub-throttle valve is transmitted to the main throttle valve through a link system (see Japanese Laid-Open Patent Application Publication No. 2005-106048). To be specific, during cold start (first idling), the ECU opens the sub-throttle valve for a predetermined time period and thereby opens the main throttle valve by a small angle to obtain a desired amount of air, enabling stable combustion.

In a motorcycle with such a throttle body, when a throttle grip is returned to cause the engine to decelerate from a high-engine speed condition and a clutch is turned off, the main throttle valve is closed, causing the amount of air to rapidly decrease. And, the engine runs idle under the condition in which a rotational inertia force is not transmitted from a drive wheel to the engine. As a result, the engine speed tends to decrease. In particular, since weight of a fly wheel mounted to a crankshaft of the engine is small in the motorcycle, the engine speed significantly decreases during deceleration associated with the off-operation of the clutch as compared to automobile. If the engine speed decreases excessively during the deceleration in the clutch off-state, then smooth operation of the engine is difficult to achieve, and the rider is unable to obtain a comfortable feeling ride when the engine is accelerating after the deceleration. In addition, combustion tends to be unstable. As a result, unfavorable emission of exhaust gas occurs.

SUMMARY OF THE INVENTION

The present invention addresses the above described conditions, and an object of the present invention is to provide a method and system for controlling an engine for a vehicle that are capable of inhibiting excess reduction of an engine speed when the engine speed decreases from a predetermined value or more and a clutch is turned off.

According to one aspect of the present invention, there is provided a method of controlling an engine for a vehicle comprising increasing an amount of air taken into the engine to an amount larger than an idling air amount corresponding to an idling engine speed, when an engine speed of the engine is a predetermined value or more, a throttle valve for controlling the amount of air taken into the engine has not been operated to be opened, and a clutch is in an off-state not to permit transmission of a drive force from the engine to a running drive element of the vehicle.

In such a configuration, when a throttle grip is operated, for example, returned to a closed state to close the throttle valve and the clutch is turned off while the engine is running at a predetermined value or more, a suitable amount of air can be taken into the engine and thus excess decrease of the engine speed can be inhibited. As a result, the engine operation becomes smooth, which provides the rider with a comfortable feeling ride. In addition, since the fuel is stably combusted, unfavorable emission of exhaust gas can be reduced. As used herein, the term "running drive element" means a drive wheel in vehicles such as motorcycles, and a water jet pump in personal watercraft, etc.

The amount of air taken into the engine may be increased in such a manner that the throttle valve is moved to an opening degree larger than an idling position corresponding to the idling engine speed.

In such a configuration, the amount of air taken into the engine can be easily increased by moving the throttle valve to the opening degree larger than the idling position. As a result, the rider can obtain a comfortable feeling ride and unfavorable emission of exhaust gas can be reduced.

The amount of air taken into the engine may be increased in such a manner that secondary air which is fresh air is guided to an exhaust port of the engine.

In such a configuration, when the throttle grip is operated, for example, returned to a closed state to close the throttle valve and the clutch is turned off while the engine is running at a predetermined value or more, the secondary air valve is opened to guide the fresh air to the exhaust port of the engine. Thereby, since the fresh air flows back from the exhaust port into a combustion chamber of the engine, the amount of air taken into the engine can be increased. Therefore, excess decrease of the engine speed can be inhibited. As a result, the engine operation becomes smooth, which provides the rider with a comfortable feeling ride. In addition, since the fuel is stably combusted, unfavorable emission of exhaust gas can be reduced.

According to another aspect of the present invention, there is provided an engine control system for a vehicle comprising an engine speed detector configured to detect an engine speed of an engine; a throttle operation detector configured to detect whether or not a first throttle valve for controlling an amount of air taken into the engine has been operated to be opened; a clutch condition detector configured to detect whether a clutch is in an on-state to permit transmission of a drive force from the engine to a running drive element or in an off-state not to permit transmission of the drive force; and a controller configured to execute control to increase the amount of air taken into the engine to an amount larger than an idling air amount corresponding an idling engine speed, when the engine speed detector detects that the engine speed is a predetermined value or more, the throttle operation detector detects that the first throttle valve has not been operated to be opened, and the clutch condition detector detects that the clutch is in the off-state.

In such a configuration, when the throttle grip is operated, for example, returned to a closed state to close the throttle valve and the clutch is turned off while the engine is running at a predetermined value or more, a suitable amount of air can be taken into the engine and thus excess decrease of the engine speed can be inhibited. As a result, the engine operation becomes smooth, which provides the rider with a comfortable feeling ride. In addition, since the fuel is stably combusted, emission of exhaust gas can be reduced.

The controller may be configured to execute dashpot control to increase the opening degree of the first throttle valve from an idling position corresponding to the idling engine speed, thereby increasing the amount of air taken into the engine.

In such a configuration, the amount of air taken into the engine can be easily increased by moving the throttle valve to the opening degree larger than the idling position. As a result, the rider can obtain a comfortable feeling ride and unfavorable emission of exhaust gas can be reduced.

The controller may be configured to execute control to open the first throttle valve to a predetermined angle in association with an operation of a second throttle valve that is arranged in series with the first throttle valve in an air flow direction and is configured to be driven by an actuator.

In a so-called double throttle valve system, the second throttle valve (sub-throttle valve) is opened by the actuator (e.g., motor) and thereby the first throttle valve (main throttle valve) is opened to the predetermined angle in association with the opening operation of the second throttle valve so that the suitable of amount of air can be taken into the engine stably.

The engine control system for a vehicle may further comprise an air-intake pressure sensor configured to detect an air-intake pressure of an air-intake passage coupled to the engine. The controller may be configured to terminate the control so as to decrease an opening degree of the first throttle valve when the air-intake pressure sensor detects that an air-intake negative pressure is less than a predetermined value.

In a case where the engine speed decreases to an extent that a negative pressure in the air-intake passage is decreased to the predetermined value or less, the fuel can be stably combusted if the first throttle valve is closed. Therefore, fuel efficiency is improved by closing the first throttle valve.

The engine control system for a vehicle may further comprise a secondary air valve configured to open and close a secondary air supply passage through which fresh air is guided to an exhaust port of the engine. The controller may be configured to execute secondary air supply control to open the secondary air valve, thereby increasing the amount of air taken into a combustion chamber of the engine.

In such a configuration, when the throttle grip is operated, for example, returned to the closed state to close the throttle valve and the clutch is turned off while the engine is running at a predetermined value or more, the fresh air flows back from the exhaust port into the combustion chamber of the engine, and thus the amount of air taken into the engine can be increased. Therefore, excess decrease of the engine speed can be inhibited. As a result, the engine operation becomes smooth, which provides the rider with comfortable ride feeling. In addition, since the fuel is stably combusted, unfavorable emission of exhaust gas can be reduced.

The controller may be configured to cause the secondary air valve to be closed when the engine speed detector detects that the engine speed is a predetermined value or more, the throttle operation detector detects that the first throttle valve has not been operated to be opened, and the clutch condition detector detects that the clutch is in the on-state.

Thereby, it is possible to inhibit occurrence of after fire of the gas combusted incompletely at a downstream region of the exhaust port of the engine, which may be caused by rapid deceleration in the amount of air taken into the combustion chamber of the engine just after the deceleration operation.

The engine control system may further comprise a gear position detector configured to detect a transmission gear position of the engine. The controller may be configured to cause the amount of air taken into the engine to be increased to the amount larger than the idling air amount corresponding to the idling engine speed, when the gear position detector detects that the transmission gear position is a predetermined value or more.

In such a configuration, even when the rider has performed a throttle close operation to rapidly decrease the engine speed in a high gear position in which fuel is more likely to adhere to an inner wall of an intake port, a suitable amount of air can be obtained under the dashpot control. Thereby, it is possible to inhibit the fuel adhering to the inner wall of the intake port into vaporizing into an air-fuel mixture. As a result, rapid decrease of the engine speed due to reduced combustion can be inhibited.

According to a further aspect of the present invention, there is provided a motorcycle comprising the above mentioned engine control system.

The above and further objects and features of the invention will more fully be apparent from the following detailed description with accompanying drawings.

DETAILED DESCRIPTION OF THE PREFERRED EMBODIMENTS

Hereinafter, an embodiment of the present invention will be described with reference to the accompanying drawings. As used herein, the directions are defined from the perspective of a rider (not shown) straddling a motorcycle.

Figure 1:
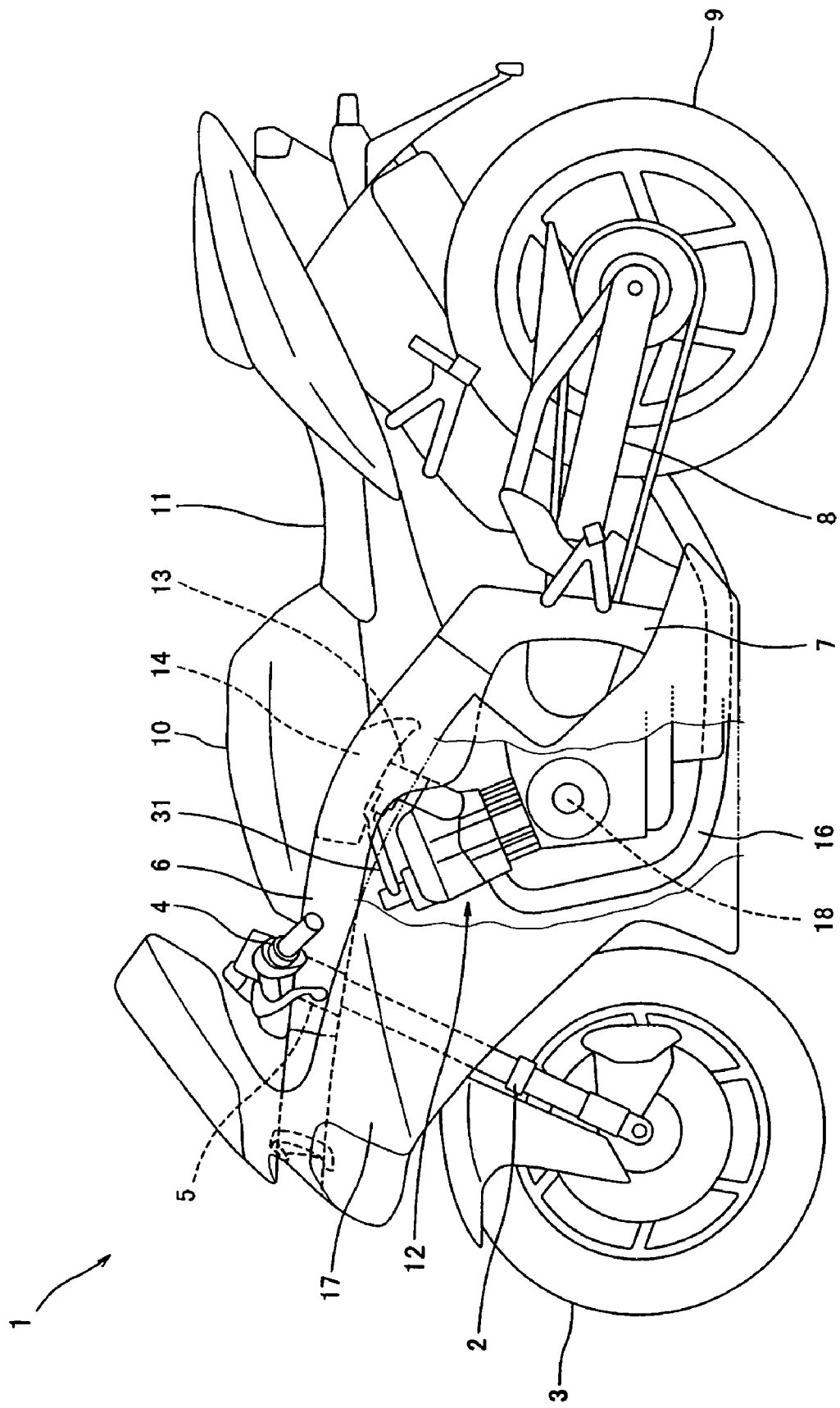
FIG. 1 is a side view of a motorcycle including an engine control system according to an embodiment of the present invention, a part of which is cut away.

FIG. 1 is a side view of a road-sport type motorcycle 1 including an engine control system according to the embodiment of the present invention. Turning now to FIG. 1, the motorcycle 1 includes a front fork 2 extending substantially vertically with a predetermined caster angle. A front wheel 3, which is a steering wheel, is rotatably mounted to a lower portion of the front fork 2. A bar-type steering handle 4 is attached to an upper portion of the front fork 2 by a steering shaft (not shown). The steering shaft is rotatably mounted to a head pipe 5 forming a frame of a vehicle body of the motorcycle 1. The front wheel 3 is steered by the rider's operation of rotating the steering handle 4 to the right or to the left.

A pair of right and left main frames 6 extend rearward from the head pipe 5. A pair of right and left pivot frames 7 are coupled to rear portions of the main frames 26. A swing arm 8 extends substantially forward and rearward and is mounted to each pivot frame 7 to be vertically pivotable around a front end portion thereof. A rear wheel 9 (running drive element), which is a drive wheel, is rotatably mounted to a rear portion of the swing arm 8. A fuel tank 10 is disposed behind the steering handle 4. A seat 11 which is straddled by a rider is mounted behind the fuel tank 10.

Figure 2:
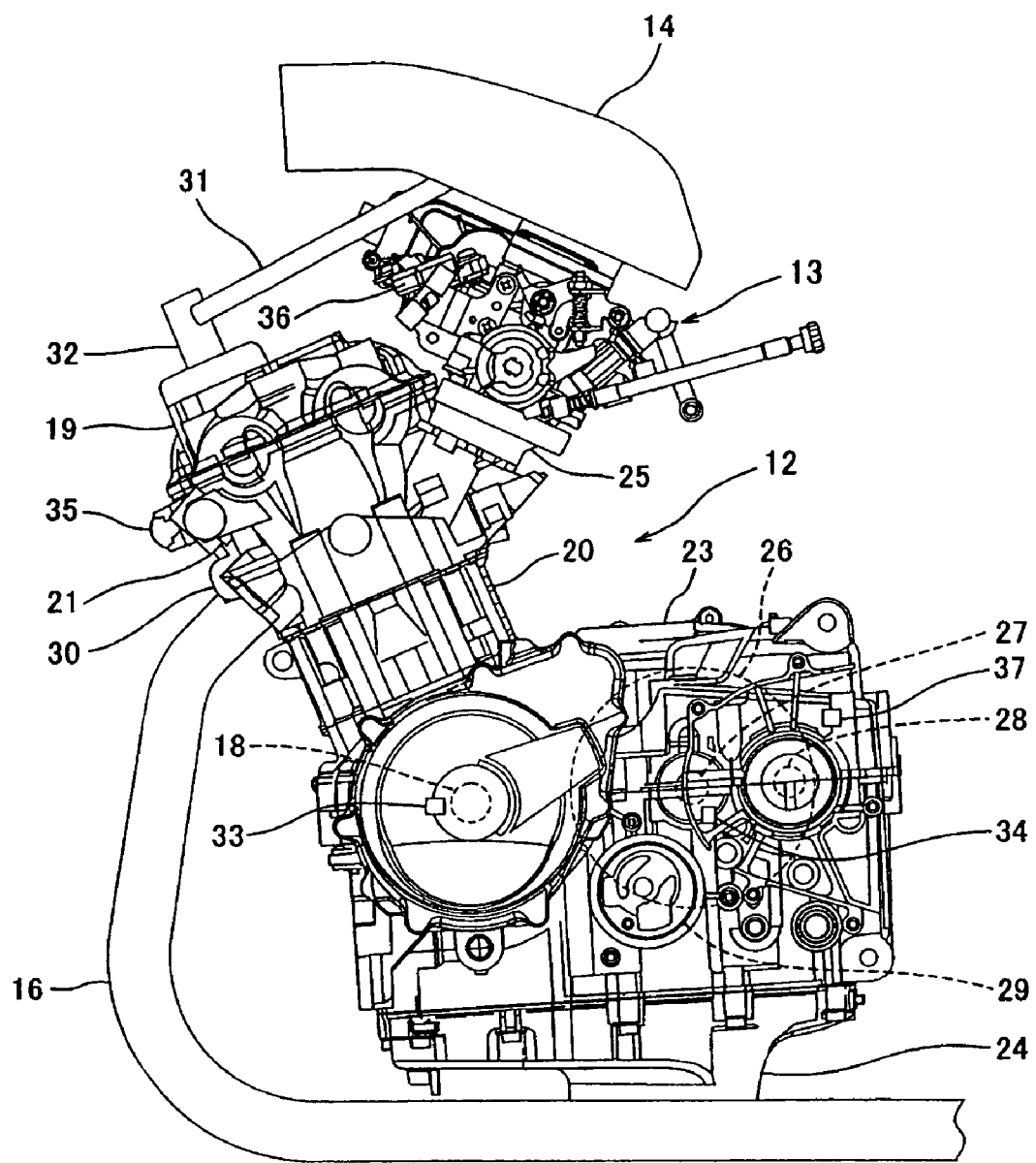
FIG. 2 is an enlarged left side view showing a region surrounding an engine of the motorcycle of FIG. 1.

An in-line four-cylinder engine 12 is mounted on the main frames 6 and the pivot frames 7 and is disposed between the front wheel 3 and the rear wheel 9 in such a manner that a center axis of a crankshaft 18 is oriented in a lateral (width) direction of a vehicle body. An exhaust pipe 16 is coupled to exhaust ports 30 (FIG. 2) of the engine 12, whereas a throttle device 13 is mounted between the main frames 6 and is coupled to intake ports 25 (FIG. 2). An air cleaner box 14 is disposed below the fuel tank 10 and is coupled to an upper region of the throttle device 13 which is located upstream in an air flow taken into the engine E. The air cleaner box 14 is configured to take in the air from outside by utilizing a running wind (ram pressure) from forward. The air cleaner box 14 is coupled to the exhaust ports 30 (FIG. 2) of the engine 12 through a secondary air supply pipe (secondary air supply passage) 31. A cowling 17 is mounted to extend from a front portion of the vehicle body to side portions of the vehicle body so as to cover the engine 12, etc.

FIG. 2 is an enlarged left side view of the engine 12 of the motorcycle 1. As shown in FIG. 2, the engine 12 includes a crankcase 23 that accommodates the crankshaft 18, a cylinder block 20 coupled to an upper region of the crankcase 23 and forming each of four cylinders, a cylinder head 21 that is coupled to an upper region of the cylinder block 20 and is configured to form a combustion chamber together with the cylinder block 20 and to accommodate a DOHC (double overhead cam) valve system, and a cylinder head cover 19 configured to cover the cylinder head 21 from above. The engine 12 is equipped with a clutch 26 configured to be turned on and off in order to and not to permit transmission of a drive force of the engine 12 to the rear wheel 19 (FIG. 2). The crankcase 23 accommodates a main shaft 27 and a counter shaft 28 which constitute a transmission system. The main shaft 27 is configured to rotate in association with the crankshaft 18 with the clutch 26 being in an on-state. The counter shaft 28 is configured to transmit the drive force from the main shaft 27 to the rear wheel 9 through a chain. An oil pan 24 is coupled to a lower portion of the crankcase 23 and is configured to store lubricating oil. An oil pump 29 is configured to feed the lubricating oil to respective components of the engine 12 to lubricate and cool them.

The four exhaust ports 30 through which an exhaust gas emitted from the engine 12 is exhausted are formed at a front region of the cylinder head 21 (only leftmost exhaust port is illustrated in FIG. 2). This exhaust port 30 opens forward and downward and is coupled to an upstream end of the exhaust pipe 16. The four intake ports 25 through which the air taken in from outside is supplied to the combustion chambers are formed at a rear region of the cylinder head 21 so as to correspond to the cylinders of the engine 12, respectively (only leftmost intake port is illustrated in FIG. 2). The throttle device 13 is coupled to the intake ports 25. The air cleaner box 14 is coupled to an upper region of the throttle device 13. The air cleaner box 14 is coupled to the exhaust ports 30 through the secondary air supply pipe 31. Fresh air is supplied to the exhaust ports 30 to re-combust the exhaust gas existing there, thereby decreasing CO (carbon oxide) and HC (hydrocarbon). Thus, the exhaust gas is cleaned. The secondary air supply pipe 31 is provided with a secondary air solenoid valve (secondary air valve) 32 configured to electrically open and close the passage by a solenoid and a check valve (not shown) configured to inhibit the back flow of the air from the exhaust port 30 side to the air cleaner box 14 side.

The crankcase 23 is equipped with a crank angle sensor 33 configured to detect a rotational angle of the crankshaft 18, a clutch sensor 34 configured to detect whether a clutch 26 is in an on-state or in an off-state, and a gear position sensor 37 configured to detect a transmission gear position. The cylinder head 21 is equipped with a cam angle sensor 35 configured to detect an angle of a cam that drives an exhaust valve 55 (see FIG. 7).

Figure 3:
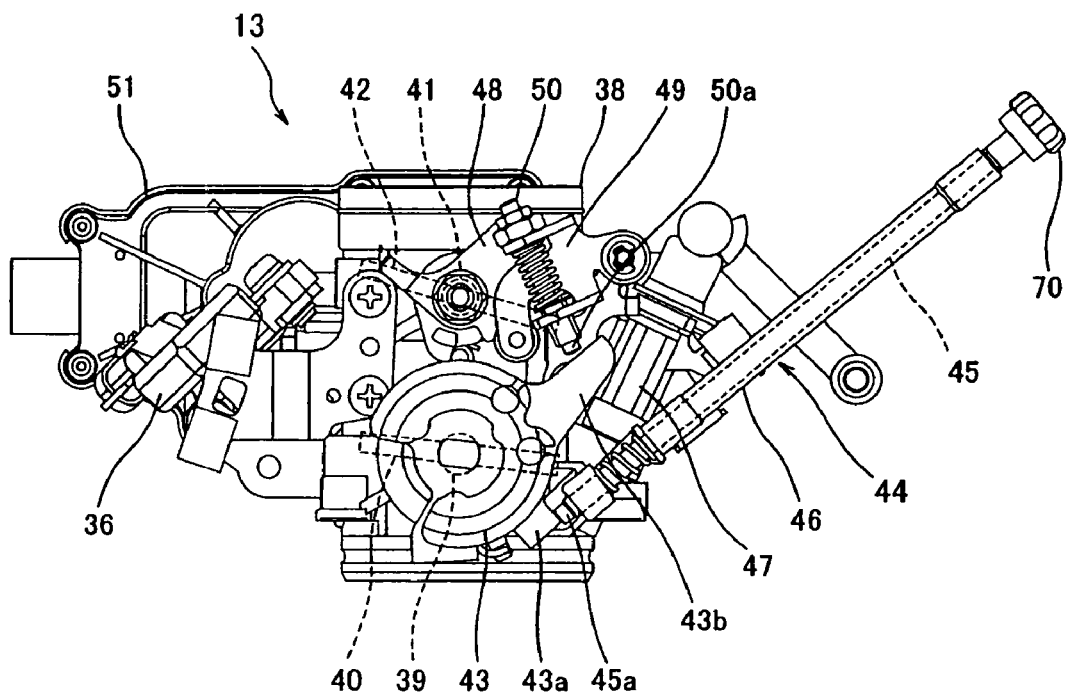
FIG. 3 is a left side view of a throttle device of the engine of FIG. 2.

FIG. 3 is left side view of the throttle device 13. As shown in FIG. 3, the throttle device 13 includes a throttle body 38 having four air-intake passages respectively coupled to the four intake ports 25 (see FIG. 2) of the engine 12. A disc-shaped main throttle valve (throttle valve or first throttle valve) 40 is disposed at a downstream region of each of the air-intake passages of the throttle body 38 as indicated by a broken line and is openably mounted on a main throttle shaft 39, and a disc-shaped sub-throttle valve (second throttle valve) 42 is disposed at an upstream region of each air-intake passage and is openably mounted on a sub-throttle shaft 41. An air-intake pressure sensor 36 is attached on the throttle body 38 and is configured to detect an air-intake pressure in each air-intake passage.

A main throttle pulley 43 is attached on a left end of the throttle body 38 and is coupled to the main throttle shaft 39. The main throttle pulley 43 is coupled to a throttle grip of the steering handle 4 (FIG. 1) through a cable (not shown). According to a rotation operation amount of the throttle grip, the main throttle pulley 43 is rotated to cause the main throttle valve 40 to open and close.

A first contact portion 43a and a second contact portion 43b protrude radially outward from the main throttle pulley 43. The main throttle pulley 43 is biased by a spring (not shown) to bring the first contact portion 43a into contact with an idling control element 44. The idling control element 44 is constructed such that a cable 45 is inserted into a tube 46. By rotating a screw portion 70 attached at a rear end thereof, a tip end portion 45a of the cable 45 advances and retracts in contact with the first contact portion 43a to adjust an angle of the main throttle valve 40 in a fully closed position.

Above the main throttle pulley 43, a first link member 48 is coupled to the sub-throttle shaft 41, and a second link member 49 is mounted to be pivotable in association with the first link member 48. An adjusting bolt 50 is attached to the second link member 49 to be opposite to the second contact portion 43b. A sub-throttle motor (actuator) 51 is mounted on the throttle body 38 and is configured to rotate the sub-throttle shaft 41. In accordance with an instruction from an ECU (electronic control unit) 57 equipped in the vehicle body described later, the sub-throttle motor 51 causes the sub-throttle valve 42 to be opened and closed.

In such a configuration, during a cool start of the engine 12, the sub-throttle motor 51 drives the sub-throttle valve 42 to cause the first link member 48 and the second link member 49 to be pivoted, bringing the tip end portion 50a of the adjusting bolt 50 into contact with the first contact portion 43b. The adjusting bolt 50 applies a pressing force to cause the first contact portion 43b to move clockwise in a left side view. Thereby, the main throttle pulley 43 rotates with a small angle to enable the main throttle valve 40 to be moved to an opening degree required for the first idle (first idling (FID) system).

Figure 4:
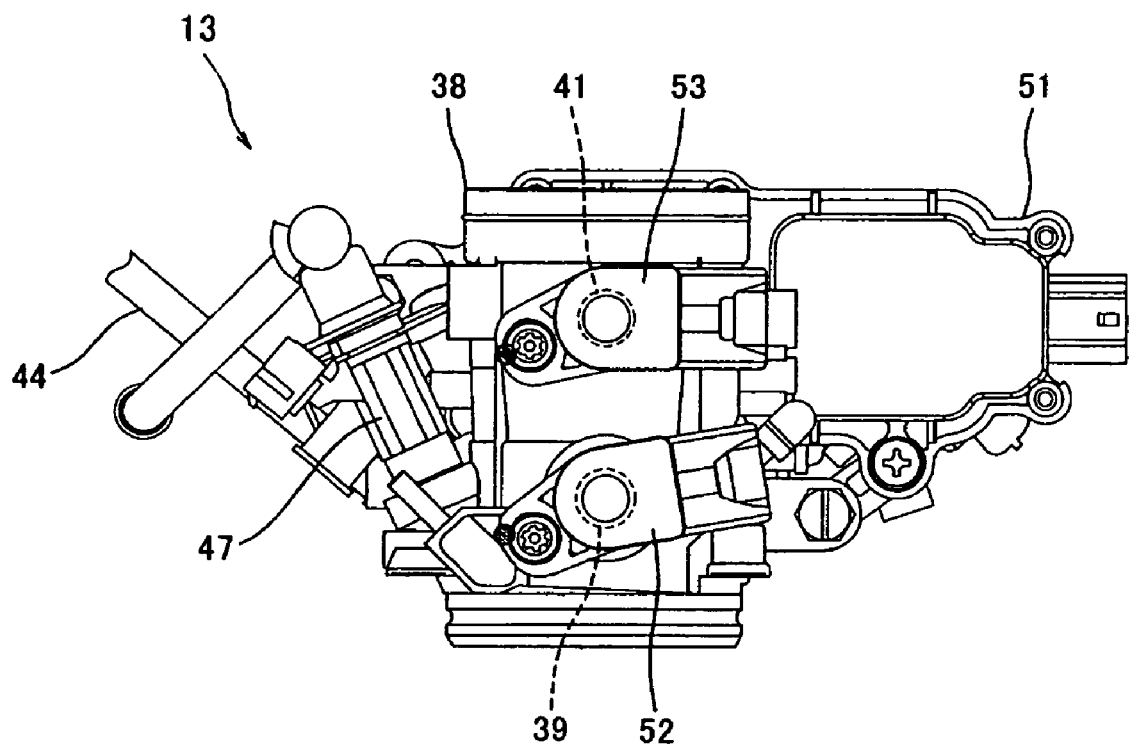
FIG. 4 is a right side view of the throttle device of the engine of FIG. 2.

FIG. 4 is a right side view of the throttle device 13. As shown in FIG. 4, a main throttle opening degree sensor 52 is attached on a right end of the throttle body 38 and is configured to detect a rotational angle of the main throttle shaft 39.

In addition, a sub-throttle opening degree sensor 53 is attached on the right end of the throttle body 38 and is configured to detect a rotational angle of the sub-throttle shaft 41. Further, an injector 47 is mounted to the throttle body 38 and is configured to inject fuel into the corresponding air-intake passage.

Figure 5:
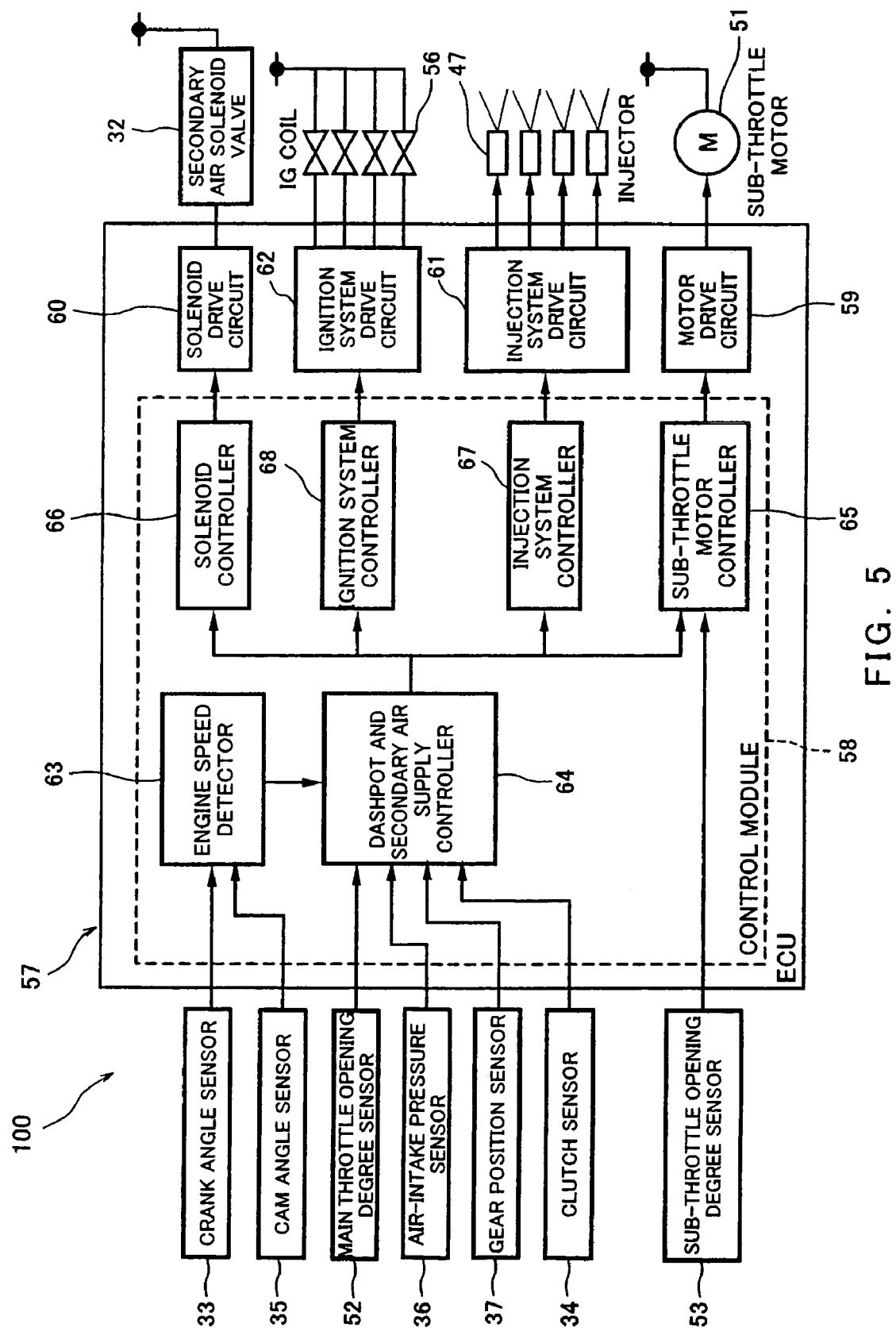
FIG. 5 is a block diagram of the engine control system of the engine of FIG. 2.

FIG. 5 is a block diagram of an engine control system 100 built into the motorcycle 1. As shown in FIG. 5, the engine control system 100 is equipped with various sensors such as the crank angle sensor 33, the cam angle sensor 35, the main throttle opening degree sensor 52, the air-intake pressure sensor 36, the gear position sensor 37, the clutch sensor 34, and the sub-throttle opening degree sensor 53. The ECU 57 receives detection signals from these sensors. Based on the detection signals, the ECU 57 controls the operation of the secondary air solenoid valve 32, ignition coils 56, the injectors 47, the sub-throttle motor 51, etc.

The ECU 57 includes a motor drive circuit 59 configured to drive the sub-throttle motor 51, a solenoid drive circuit 60 configured to drive the secondary air solenoid valve 32, an injection system drive circuit 61 configured to drive the injectors 47, an ignition system drive circuit 62 configured to drive the ignition coils 56, and a control module 58 configured to control these circuits by MPU (micro processing unit), etc. The control module 58 includes an engine speed detector 63, a dashpot and secondary air supply controller 64, a sub-throttle motor controller 65, a solenoid controller 66, an injection system controller 67, and an ignition system controller 68.

The engine speed detector 63 is configured to be able to calculate an engine speed (rpm) based on the rotational angle of the crankshaft 18 that is detected by the crank angle sensor 33 or the rotational angle of the cam (not shown) configured to drive the exhaust valve 55 which is detected by the cam angle sensor 35. The dashpot and secondary air supply controller 64 determines that the engine speed starts decreasing from a predetermined engine speed or more in a predetermined gear position or more and the clutch is turned off, based on detection signals received from the main throttle opening degree sensor 52, the air-intake pressure sensor 36, the gear position sensor 37, the clutch sensor 34, and the engine speed detector 63 of the control module 58. Then, the dashpot and secondary air supply controller 64 executes dashpot control to increase the amount of the air supplied from the throttle device 13 to the engine 12 and executes secondary air supply control to supply secondary air from the secondary air supply pipe 31, thereby increasing an idling engine speed.

The sub-throttle motor controller 65 causes the motor drive circuit 59 to drive the sub-throttle motor 51, thereby causing the main throttle valve 40 to be moved to an opening degree larger than an idling position corresponding to an idling engine speed in association with the movement of the sub-throttle valve 42, when the dashpot and secondary air supply controller 64 determines that dashpot control and the secondary air supply control are necessary. The solenoid controller 66 causes the solenoid drive circuit 60 to open the secondary air solenoid valve 32 to guide the secondary air toward the exhaust port 30 when the dashpot and secondary air supply controller 64 determines that the dashpot control and the secondary air supply control are necessary. The injection system controller 67 is configured to control the amount of the fuel injected from the injector 47 according to an increase in the amount of air resulting from the dashpot control and the secondary air supply control. The ignition system controller 68 is configured to control an ignition timing of the ignition coils 56 according to the engine speed.

The motor drive circuit 59 is configured to drive the sub-throttle motor 51 in accordance with a control signal from the sub-throttle motor controller 65. The solenoid drive circuit 60 is configured to open and close the secondary air solenoid valve 32 in accordance with a control signal from the solenoid controller 66. The injection system drive circuit 61 is configured to drive the injectors 47 while controlling the fuel injection amount in accordance with a control signal from the system controller 67. The ignition system drive circuit 62 is configured to drive the ignition coils 56 at desired ignition timings in accordance with a control signal from the ignition system controller 68.

Figure 6:
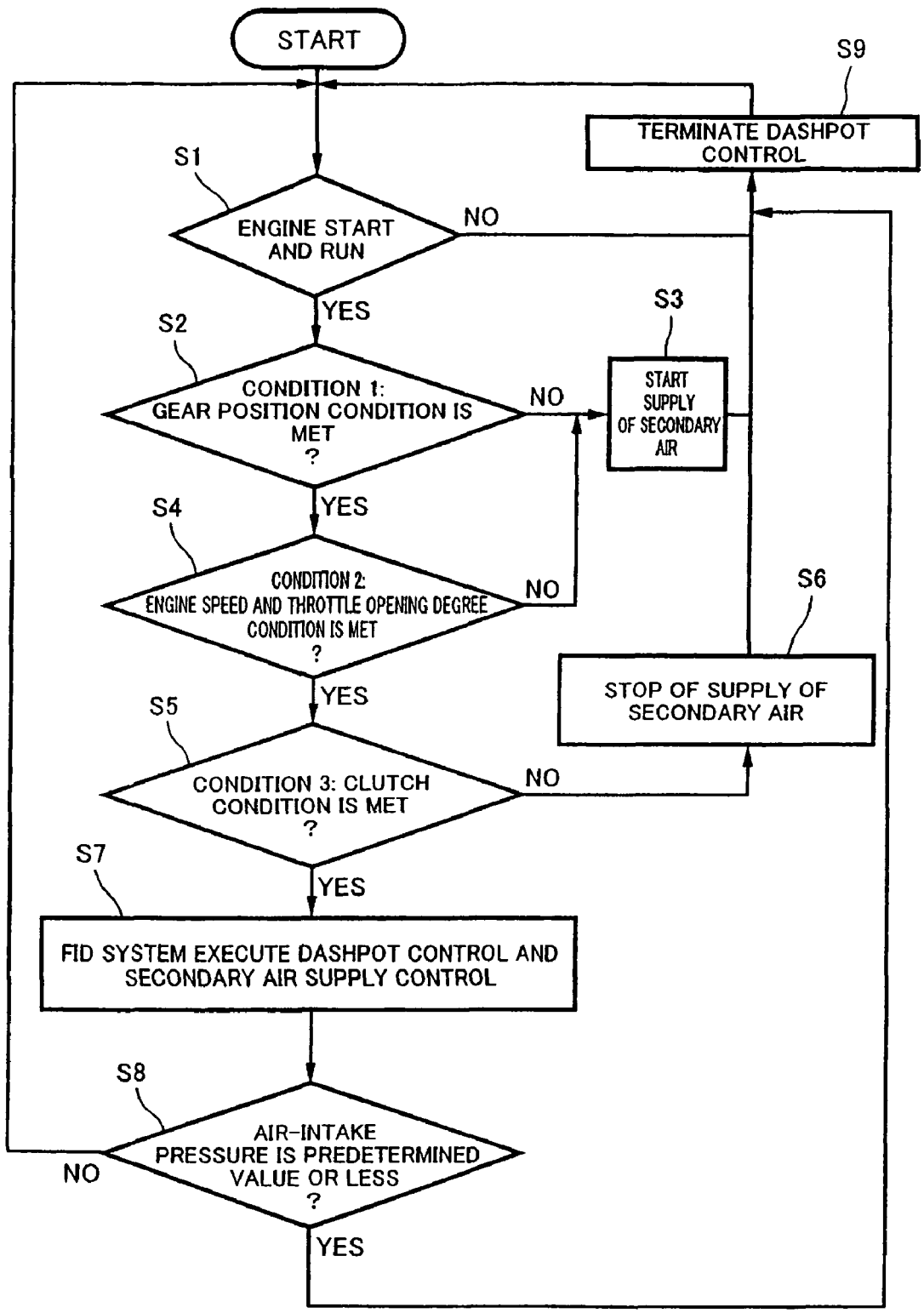
FIG. 6 is a flowchart showing a control procedure of the engine control system of FIG. 5.
Figure 7:
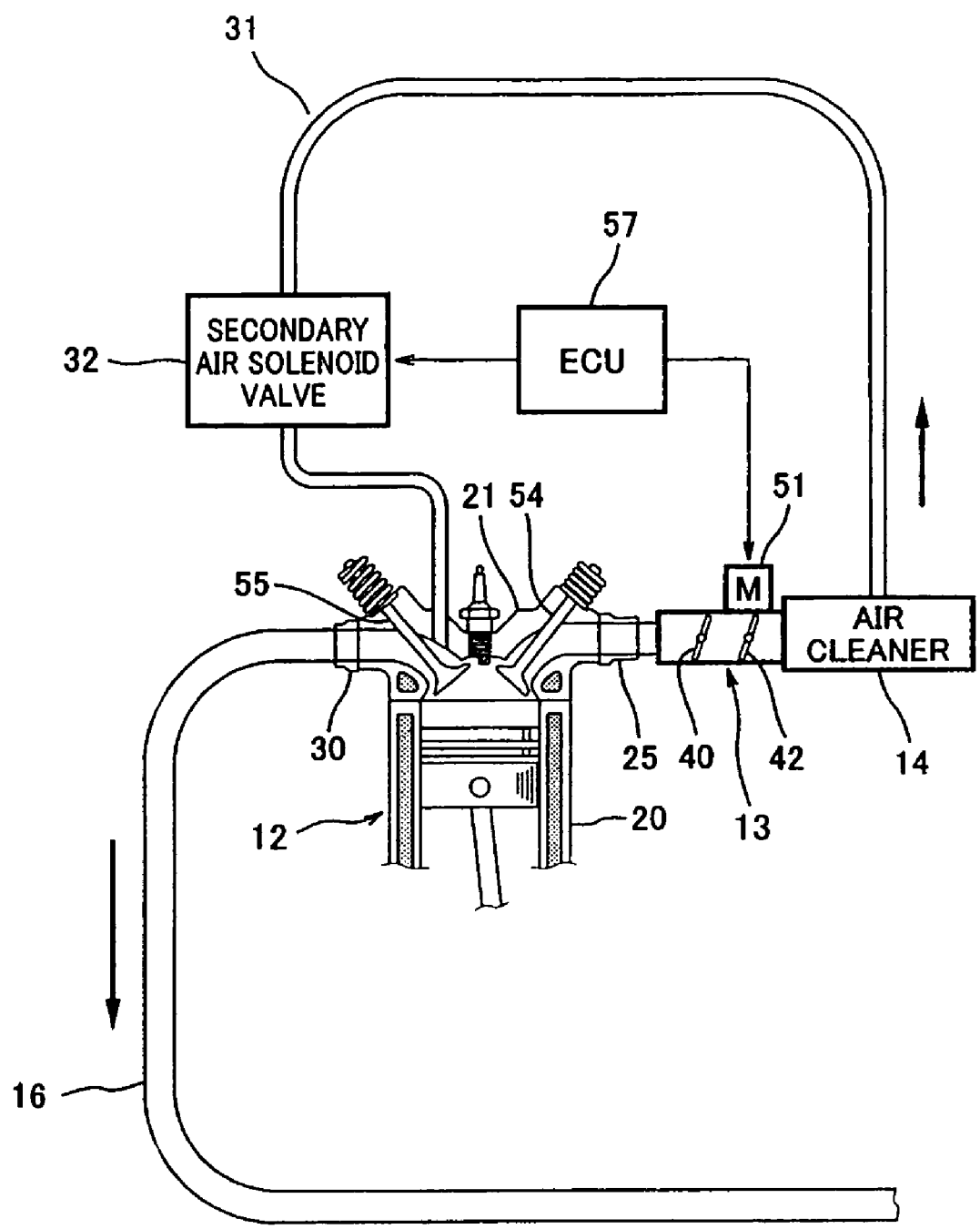
FIG. 7 is a view showing air flow in the engine of FIG. 2.
Figure 8:
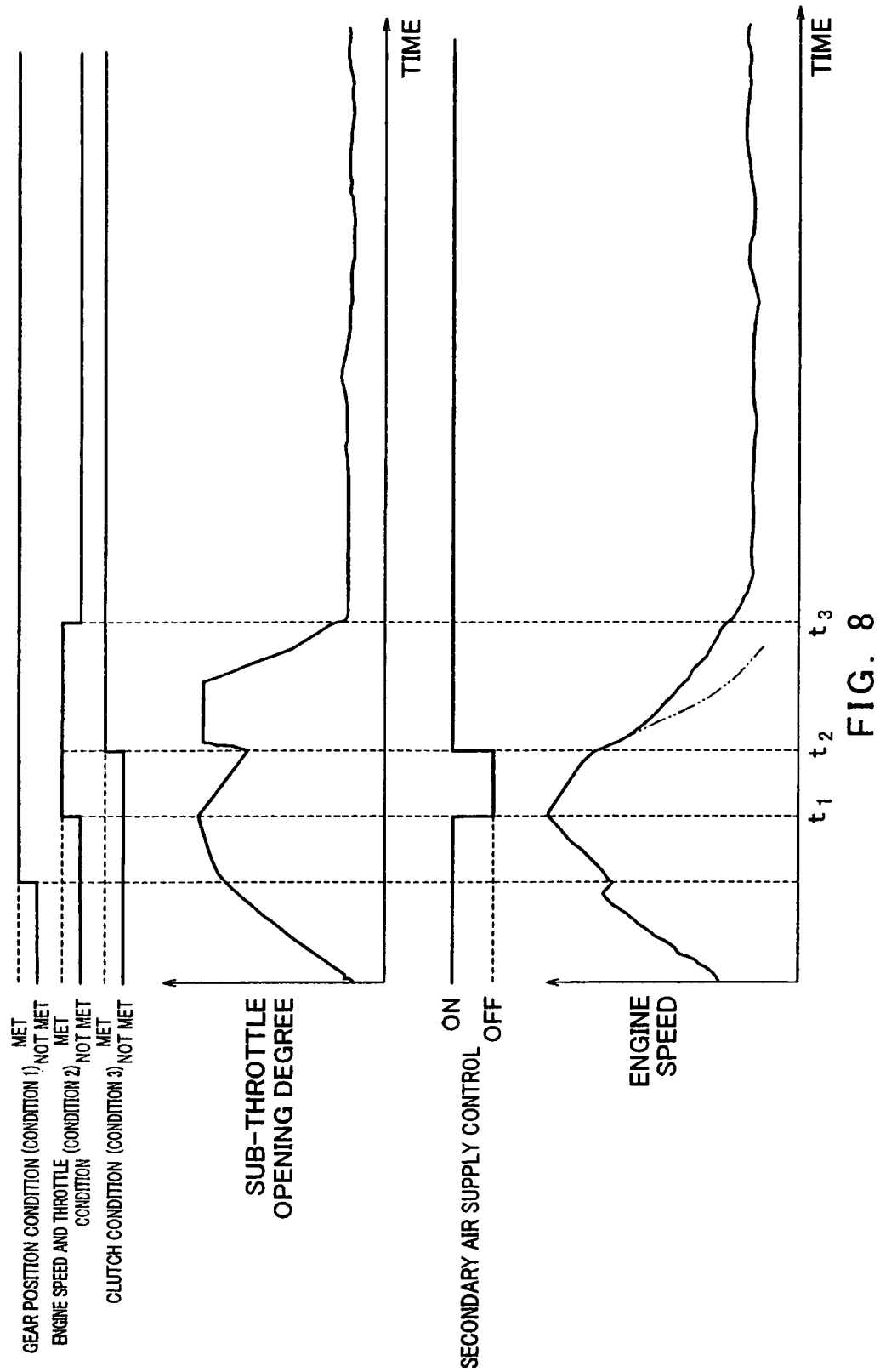
FIG. 8 is a timing chart showing an operation of the engine control system of FIG. 5.

Subsequently, an operation of the engine control system 100 will be described with reference to FIG. 5 and FIGS. 6 to 8. FIG. 6 is a flowchart showing a control procedure of the engine control system 100. FIG. 7 is a schematic view showing the air flow in the engine 12. FIG. 8 is a timing chart showing an operation of the engine control system 100. As shown in FIGS. 5 and 6, when the engine 12 starts and the motorcycle 1 starts traveling (step S1), the dashpot and secondary air supply controller 64 of the ECU 57 determines whether or not a condition 1 is met, i.e., a transmission gear position is a predetermined gear position or more (e.g., fourth gear position or more), based on the detection signal received from the gear position sensor 37 (step S2).

If it is determined that condition 1 (gear position) is not met, the secondary air solenoid valve 32 is opened in accordance with an instruction from the ECU 57, enabling the secondary air to be supplied from the air cleaner box 12 to the exhaust port 30 of the engine 12 through the check valve 69 (step S3). On the other hand, if it is determined that condition 1 (gear position) is met, then the dashpot and secondary air supply controller 64 further determines whether or not a condition 2 is met, i.e., the engine speed is a predetermined value (2500 rpm in this embodiment) or more in a range of 2000 to 3000 rpm and the main throttle valve 40 is in the idling position (in a closed position) corresponding to the idling engine speed without the rider's throttle operation of opening the main throttle valve 40, based on the detection signal received from the crank angle sensor 33 (or cam angle sensor 35) and the detection signal received from the main throttle opening degree sensor 52 (step S4). If it is determined that condition 2 (gear position condition) is not met in step S2, the secondary air solenoid valve 32 is opened in accordance with an instruction from the ECU 57, enabling the secondary air to be supplied from the air cleaner box 12 to the exhaust port 30 of the engine 12 through the check valve 69 (step S3). On the other hand, if it is determined that condition 2 (engine speed and throttle condition) is met in step S2, then the dashpot and secondary air supply controller 64 further determines whether or not a condition 3 is met, i.e., the clutch 26 is in the off-state not to permit transmission of the drive force, based on the detection signal received from the clutch sensor 34 (step S5). During a time period (time t1 to time 2 in FIG. 8) when condition 3 (clutch condition) is not met, the secondary air solenoid valve 32 is closed to inhibit occurrence of after fire of the exhaust gas combusted incompletely at a downstream region of the exhaust port 30 of the engine 12 (step S6).

If it is determined that condition 3 (clutch condition) is met and therefore conditions 1 to 3 are met in step S2 to S4 in the flowchart of FIG. 6 during a time period from time t2 to time t3 in FIG. 8, the dashpot and secondary air supply controller 64 execute the dashpot control and the secondary air supply control by utilizing the first idle system (step S7). To be specific, as shown in FIGS. 7 and 8, the sub-throttle motor 51 opens the sub-throttle valve 42 in accordance with an instruction from the ECU 57, thereby causing the main throttle valve 40 to be moved to an opening degree larger than the idling position corresponding to the idling engine speed in association with the opening operation of the sub-throttle valve 42. That is, during the idling deceleration (deceleration in a clutch off-state), the main throttle valve 40 is moved to the opening degree larger than the idling position, thereby increasing the amount of air supplied from the air cleaner box 14 into the engine E.

Simultaneously, the secondary air solenoid valve 32 is opened in accordance with an instruction from the ECU 57 to allow the secondary air to be supplied from the air cleaner box 14 to the exhaust port 30 of the engine 12 through the check valve 69. The operation of an intake valve 54 and the operation of an exhaust valve 55 overlap a little in time. Upon the valves 54 and 55 being opened simultaneously in an air-intake step, the secondary air is guided from the exhaust port 30 to the combustion chamber defined by the cylinder block 20 and the cylinder head 21. The injection system controller 67 outputs an instruction signal to the injection system drive circuit 61 to control the amount of fuel injected from the injectors 47 according to an increase in the amount of the air resulting from the dashpot control and the secondary air supply control, and the ignition system controller 68 outputs an instruction signal to the ignition system drive circuit 62 to control the ignition timing of the ignition coils 56 according to the engine speed at that point of time.

As a result, since the amount of the air taken into the engine 12 increases, a rapid decrease in the engine speed as indicated by a two-dotted line in FIG. 8 is inhibited and thus the engine speed gradually decreases. If the dashpot and secondary air supply controller 64 of the ECU 57 determines that an average value per cycle of the air-intake pressure (negative pressure) detected by the air-intake pressure sensor 36 is a predetermined value (2500 mmHg in this embodiment) or less in a range of, for example, 230 to 300 mmHg (step S8), the sub-throttle motor 51 causes the sub-throttle valve 42 to be closed, thereby causing the main throttle valve 40 to be closed in association with the closing operation of the sub-throttle valve 42, to create a normal idling state, and thus the dashpot control terminates (step S9), because it is assumed that combustion is now stable after the engine speed has decreased to some degree. In addition, if any of conditions 1 to 3 is not met, then the dash pot control terminates (step S9). If the dashpot and secondary air supply controller 64 determines that the average value per cycle of the air-intake pressure (negative pressure) detected by the air-intake pressure 36 is larger than the predetermined value (step S8), then it returns the process to step S1 and repeats the above described procedure.

In the above described configuration, even when the throttle grip is operated, for example, returned to a closed state, to close the main throttle valve 40 and the clutch 26 is turned off while the engine is running at a predetermined value or more, the main throttle valve 40 is moved to the opening degree larger than the idling position in a normal state, and the secondary air solenoid valve 32 is opened to cause the secondary air to flow back from the exhaust port 30 to the engine 12. Thereby, since a suitable amount of air can be supplied into the combustion chamber of the engine 12, it is possible to inhibit rapid decrease in the engine speed. As a result, the engine operation during the idling deceleration (deceleration in the clutch off-state) becomes smooth, which provides the rider with comfortable feeling ride. In addition, since the fuel is stably combusted, unfavorable emission of exhaust gas can be reduced. In particular, by executing the dashpot control and the secondary air supply control in a higher gear position (e.g., fourth gear position or higher) in which the engine speed is likely to rapidly decrease, the operation of the engine E becomes smooth.

Whereas the dashpot control and the secondary air control are executed simultaneously in this embodiment, only one of them may alternatively be executed. Among conditions 1 to 3 to determine whether or not to execute the dashpot control and the secondary air supply control, condition 1 (gear position condition) in step S2 may be omitted. In addition, the stop of supply of the secondary air in step S6 may be omitted. Furthermore, the control to terminate the dashpot control which is executed in step S9 when the air-intake pressure is predetermined value or less in step S8 may be omitted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An engine control system for a vehicle comprising:
a throttle operation detector configured to detect whether or not a throttle valve for controlling an amount of air taken into an engine of the vehicle has been operated to be opened;
a clutch condition detector configured to detect whether a clutch is in an on-state to permit transmission of a drive force from the engine to a running drive element or in an off-state not to permit transmission of the drive force; and
a controller configured to execute control to increase the amount of air taken into the engine to an amount larger than an idling air amount corresponding to an idling engine speed when the vehicle is traveling, when the throttle operation detector detects that the throttle valve has not been operated to be opened, and when the clutch condition detector detects that the clutch is in the off-state;
wherein the controller is configured to execute dashpot control to increase an opening degree of the throttle valve to an idling position corresponding to the idling engine speed, thereby increasing the amount of air taken into the engine;
wherein the throttle valve is a first throttle valve, and wherein the controller is configured to execute control to open the first throttle valve to a predetermined angle in association with an operation of a second throttle valve that is arranged in series with the first throttle valve in an air flow direction and is configured to be driven by an actuator.

2. An engine control system for a vehicle comprising:
a throttle operation detector configured to detect whether or not a throttle valve for controlling an amount of air taken into an engine of the vehicle has been operated to be opened;
a clutch condition detector configured to detect whether a clutch is in an on-state to permit transmission of a drive force from the engine to a running drive element or in an off-state not to permit transmission of the drive force;
a controller configured to execute control to increase the amount of air taken into the engine to an amount larger than an idling air amount corresponding to an idling engine speed when the vehicle is traveling, when the throttle operation detector detects that the throttle valve has not been operated to be opened, and when the clutch condition detector detects that the clutch is in the off-state; and an air-intake pressure sensor configured to detect an air-intake pressure of an air-intake passage coupled to the engine;

wherein the controller is configured to execute dashpot control to increase an opening degree of the throttle valve to an idling position corresponding to the idling engine speed, thereby increasing the amount of air taken into the engine; and wherein the controller is configured to terminate the control so as to decrease the opening degree of the throttle valve when the air-intake pressure sensor detects that an air-intake negative pressure is less than a predetermined value.

3. An engine control system for a vehicle comprising:

an engine speed detector configured to detect an engine speed of an engine;

a throttle operation detector configured to detect whether or not a throttle valve for controlling an amount of air taken into the engine has been operated to be opened;

a clutch condition detector configured to detect whether a clutch is in an on-state to permit transmission of a drive force from the engine to a running drive element or in an off-state not to permit transmission of the drive force;

a controller configured to execute control to increase the amount of air taken into the engine to an amount larger than an idling air amount corresponding to an idling engine speed, when the engine speed detector detects that the engine speed is a predetermined value or more, the throttle operation detector detects that the throttle valve has not been operated to be opened, and the clutch condition detector detects that the clutch is in the off-state;

a secondary air valve configured to open and close a secondary air supply passage through which fresh air is guided to an exhaust port of the engine; and wherein the controller is configured to execute secondary air supply control to open the secondary air valve, thereby increasing the amount of air taken into the engine;

wherein the controller is configured to cause the secondary air valve to be closed when the engine speed detector detects that the engine speed is the predetermined value or more, the throttle operation detector detects that the throttle valve has not been operated to be opened, and the clutch condition detector detects that the clutch is in the on-state.

4. An engine control system for a vehicle comprising:

a throttle operation detector configured to detect whether or not a throttle valve for controlling an amount of air taken into the engine has been operated to be opened;

a clutch condition detector configured to detect whether a clutch is in an on-state to permit transmission of a drive force from the engine to a running drive element or in an off-state not to permit transmission of the drive force;

a controller configured to execute control to increase the amount of air taken into the engine to an amount larger than an idling air amount corresponding to an idling engine speed when the vehicle is traveling, when the throttle operation detector detects that the throttle valve has not been operated to be opened, and when the clutch condition detector detects that the clutch is in the off-state; and a gear position detector configured to detect a transmission gear position of the engine;

wherein the controller is configured to cause the amount of air taken into the engine to be increased to the amount larger than the idling air amount corresponding to the idling engine speed, when the gear position detector detects that the transmission gear position is a predetermined value or more.

5. An engine control system for a vehicle comprising:

a throttle operation detector configured to detect whether or not a throttle valve for controlling an amount of air taken into an engine of the vehicle has been operated to be opened;

a clutch condition detector configured to detect whether a clutch is in an on-state to permit transmission of a drive force from the engine to a running drive element or in an off-state not to permit transmission of the drive force;

a controller configured to execute control to increase the amount of air taken into the engine to an amount larger than an idling air amount corresponding to an idling engine speed when the vehicle is traveling, when the throttle operation detector detects that the throttle valve has not been operated to be opened, and when the clutch condition detector detects that the clutch is in the off-state; and a gear position detector configured to detect a transmission gear position of the engine;

wherein the controller is configured to execute dashpot control to increase an opening degree of the throttle valve to an idling position corresponding to the idling engine speed, thereby increasing the amount of air taken into the engine;

wherein the controller is configured to increase the amount of air taken into the engine to increase an engine speed when a first condition that the vehicle is traveling, a second condition that the throttle operation detector detects that the throttle valve has not been operated to be opened, and a third condition that the clutch condition detector detects that the clutch is in the off-state are satisfied in this order;

wherein the controller is configured to cause the amount of air taken into the engine to be increased to the amount larger than the idling air amount corresponding to the idling engine speed, when the gear position detector detects that the transmission gear position is a predetermined value or more; and wherein the first condition includes that the gear position detector detects that the transmission gear position is a predetermined value or more.

6. The engine control system for a vehicle according to claim 5, wherein the first condition includes the gear position detector detects that the transmission gear position is a fourth gear position or more.

7. An engine control system for a vehicle comprising:

a throttle operation detector configured to detect whether or not a throttle valve for controlling an amount of air taken into an engine of the vehicle has been operated to be opened;

a clutch condition detector configured to detect whether a clutch is in an on-state to permit transmission of a drive force from the engine to a running drive element or in an off-state not to permit transmission of the drive force;

a controller configured to execute control to increase the amount of air taken into the engine to an amount larger than an idling air amount corresponding to an idling engine speed when the vehicle is traveling, when the throttle operation detector detects that the throttle valve has not been operated to be opened, and when the clutch condition detector detects that the clutch is in the off-state; and an engine speed detector configured to detect an engine speed of the engine;

wherein the controller is configured to execute dashpot control to increase an opening degree of the throttle valve to an idling position corresponding to the idling engine speed, thereby increasing the amount of air taken into the engine;

wherein the controller is configured to increase the amount of air taken into the engine to increase the engine speed when a first condition that the vehicle is traveling, a second condition that the throttle operation detector detects that the throttle valve has not been operated to be opened, and a third condition that the clutch condition detector detects that the clutch is in the off-state are satisfied in this order; and wherein the first condition includes that the engine speed detector detects that the engine speed is a predetermined value or more and the vehicle is traveling.

8. The engine control system for a vehicle according to claim 7, wherein the predetermined value is in a range of 2000 to 3000.

9. An engine control system for a vehicle comprising:

a throttle operation detector configured to detect whether or not a throttle valve for controlling an amount of air taken into the engine has been operated to be opened;

a clutch condition detector configured to detect whether a clutch is in an on-state to permit transmission of a drive force from the engine to a running drive element or in an off-state not to permit transmission of the drive force;

a controller configured to execute control to increase the amount of air taken into the engine to an amount larger than an idling air amount corresponding to an idling engine speed when a first condition that the vehicle is traveling, a second condition that the throttle operation detector detects that the throttle valve has not been operated to be opened, and a third condition that the clutch condition detector detects that the clutch is in the off-state are satisfied;

a secondary air supply passage coupled to an exhaust port of a cylinder head of the engine; and a secondary air valve configured to open and close the secondary air supply passage through which fresh air is guided to the exhaust port;

wherein an operation of an intake valve and an operation of an exhaust valve of the engine overlap;

wherein the controller is configured to execute secondary air supply control to open the secondary air valve, thereby increasing the amount of air taken into the engine; and wherein the controller is configured to execute the secondary air supply control before the first and second conditions are satisfied in this order and to stop the secondary air supply control before the third condition is satisfied after the first and second conditions are satisfied.

10. An engine control system for a vehicle comprising:

a throttle operation detector configured to detect whether or not a throttle valve for controlling an amount of air taken into the engine has been operated to be opened;

a clutch condition detector configured to detect whether a clutch is in an on-state to permit transmission of a drive force from the engine to a running drive element or in an off-state not to permit transmission of the drive force;

a controller configured to execute control to increase the amount of air taken into the engine to an amount larger than an idling air amount corresponding to an idling engine speed when the vehicle is traveling, when the throttle operation detector detects that the throttle valve has not been operated to be opened, and when the clutch condition detector detects that the clutch is in the off-state;

a secondary air supply passage coupled to an exhaust port of a cylinder head of the engine; and a secondary air valve configured to open and close the secondary air supply passage through which fresh air is guided to the exhaust port;

wherein an operation of an intake valve and an operation of an exhaust valve of the engine overlap; and wherein the controller is configured to execute at least one of secondary air supply control to open the secondary air valve and dashpot control to increase the opening degree of the throttle valve to an idling position corresponding to the idling engine speed, to increase the amount of air taken into the engine.

* * * * *